(12) United States Patent
Bailey et al.

(10) Patent No.: US 8,088,506 B2
(45) Date of Patent: Jan. 3, 2012

(54) FLUID CONSUMING BATTERY WITH FLUID REGULATING SYSTEM

(75) Inventors: John C. Bailey, Columbia Station, OH (US); Scott W. Donne, Garden Suburb (AU)

(73) Assignee: Eveready Battery Company, Inc., St. Louis, MO (US)

( * ) Notice: Subject to any disclaimer, the term of this patent is extended or adjusted under 35 U.S.C. 154(b) by 2253 days.

(21) Appl. No.: 10/943,688

(22) Filed: Sep. 17, 2004

(65) Prior Publication Data

US 2005/0112427 A1    May 26, 2005

Related U.S. Application Data

(60) Provisional application No. 60/525,326, filed on Nov. 26, 2003.

(51) Int. Cl.
*H01M 2/02* (2006.01)
(52) U.S. Cl. ............. 429/64; 429/61; 429/122; 429/163
(58) Field of Classification Search .................. None
See application file for complete search history.

(56) References Cited

U.S. PATENT DOCUMENTS

| | | | |
|---|---|---|---|
| 4,177,327 A | 12/1979 | Mathews et al. | 429/27 |
| 5,079,106 A | 1/1992 | Urry | 429/27 |
| 5,258,239 A | 11/1993 | Kobayashi | 429/27 |
| 5,356,729 A | 10/1994 | Pedicini | 429/27 |
| 5,541,016 A | 7/1996 | Schumm, Jr. | 429/27 |
| 5,554,452 A | 9/1996 | Delmolino et al. | 429/10 |
| 5,560,999 A | 10/1996 | Pedicini et al. | 429/27 |
| 5,687,759 A * | 11/1997 | Tan | 137/486 |
| 5,733,676 A | 3/1998 | Dopp et al. | 429/27 |
| 5,795,667 A | 8/1998 | McKenzie et al. | 429/27 |
| 5,837,394 A | 11/1998 | Schumm, Jr. | 429/27 |
| 5,977,685 A | 11/1999 | Kurita et al. | 310/311 |
| 6,074,775 A | 6/2000 | Gartstein et al. | 429/53 |
| 6,106,962 A | 8/2000 | Pedicini et al. | 429/13 |

(Continued)

FOREIGN PATENT DOCUMENTS

EP    0696384    12/1996

(Continued)

OTHER PUBLICATIONS

Ashley, S. *Artificial Muscles, Scientific American*, Oct. 2003, pp. 53-59.

(Continued)

*Primary Examiner* — Ula C Ruddock
*Assistant Examiner* — Tony Chuo
(74) *Attorney, Agent, or Firm* — Russell H. Toye, Jr.

(57) ABSTRACT

The invention is an electrochemical battery cell with a fluid consuming electrode, such as an oxygen reduction electrode, and a fluid regulating system. The fluid regulating system includes a valve for adjusting the rate of passage of the fluid to the fluid consuming electrode. It is operated by an actuator that responds (e.g., by deforming) to changes in a potential applied across the actuator to open or close the valve. The applied potential can be the cell potential or an adjusted potential. The potential applied across the actuator can vary according to the need for more or less fluid in the fluid consuming electrode. The valve can be contained within the cell housing, for example between the fluid consuming electrode and one or more fluid entry ports in the cell housing, or it can be located outside the cell housing.

36 Claims, 5 Drawing Sheets

U.S. PATENT DOCUMENTS

| | | | | |
|---|---|---|---|---|
| 6,163,131 | A | 12/2000 | Gartstein et al. | 320/118 |
| 6,274,261 | B1 | 8/2001 | Tinker et al. | 429/27 |
| 6,342,314 | B1 | 1/2002 | Sieminski et al. | 429/13 |
| 6,350,537 | B1 | 2/2002 | Pedicni | 429/27 |
| 6,365,296 | B1 | 4/2002 | Young | 429/82 |
| 6,383,674 | B1 | 5/2002 | Urry | 429/27 |
| 6,384,574 | B1 | 5/2002 | McHugh et al. | 320/107 |
| 6,436,564 | B1 | 8/2002 | Witzigreuter et al. | 429/27 |
| 6,475,658 | B1 | 11/2002 | Pedicini et al. | 429/34 |
| 6,492,046 | B1 | 12/2002 | Payne et al. | 429/27 |
| 6,500,575 | B1 | 12/2002 | Shiue et al. | 429/27 |
| 6,545,391 | B1 | 4/2003 | Su et al. | 310/332 |
| 6,558,828 | B1 | 5/2003 | Guo | 429/27 |
| 6,641,947 | B1 | 11/2003 | Molloy et al. | 429/39 |
| 6,759,159 | B1 | 7/2004 | Gray et al. | 429/71 |
| 6,773,842 | B2 | 8/2004 | Liu et al. | 429/27 |
| 6,981,520 | B2 | 1/2006 | Sherman et al. | |
| 2002/0050454 | A1 | 5/2002 | Shahinpoor et al. | 204/421 |
| 2002/0061427 | A1 | 5/2002 | Vu et al. | 429/27 |
| 2002/0150814 | A1 | 10/2002 | Causton et al. | 429/82 |
| 2002/0195326 | A1 | 12/2002 | Hunter et al. | 200/181 |
| 2003/0017376 | A1* | 1/2003 | Tsai et al. | 429/27 |
| 2003/0049508 | A1 | 3/2003 | Iarochenko et al. | 429/27 |
| 2003/0156953 | A1 | 8/2003 | Chinn et al. | 417/322 |
| 2004/0048121 | A1 | 3/2004 | Motupally et al. | 429/25 |
| 2004/0265657 | A1* | 12/2004 | Beckmann et al. | 429/22 |

FOREIGN PATENT DOCUMENTS

| | | |
|---|---|---|
| EP | 0590952 | 12/1998 |
| EP | 1226619 | 7/2003 |
| GB | 2261108 | 5/1993 |
| JP | 04249867 | 9/1992 |
| JP | 06267594 | 9/1994 |
| JP | 99195438 | 7/1999 |
| JP | 00040538 | 2/2000 |
| JP | 03036895 | 2/2003 |
| WO | 0036687 | 6/0000 |
| WO | 0036696 | 6/2000 |
| WO | 0038268 | 6/2000 |
| WO | 0109519 | 2/2001 |
| WO | 0109520 | 2/2001 |
| WO | 0109521 | 2/2001 |
| WO | 0197319 | 12/2001 |
| WO | 0235641 | 5/2002 |
| WO | WO 2005/004273 * | 1/2007 |

OTHER PUBLICATIONS

Bar-Cohen, Y. "Electroactive Polymers as Artificial Muscles-Capabilities, Potentials, and Challenges", *Handbook on Biometrics*, Section 11, Chapter 8, NTS, Inc. Aug. 2000, pp. 1-13.

Raguse, B. *Nanoparticle Actuators, Advanced Materials*, 2003, 15. No. 11, Jun. 5, pp. 922-926.

Baughman, R. *Carbon Nanotube Actuators, Science*, vol. 284, May 21, 1999, pp. 1340-1344.

Beaulieu, L. *Colossal Reversible Volume Changes in Lithium Alloys, Electrochemical and Solid-State Letters*, 4 (9) A137-A140 (2001).

Dalton, L., *Physical and Polymer Chemistry/Research Focus*, [on line] [retrieved Jul. 15, 2003], www.chem.usc.edu/faculty.

Kwang, J., *Design and Development of Multifunctional Artificial Muscle and Sensor Systems for NASA Space Robotics Applications*, National Space Grant (NSG) College and Fellowship Program (NASA), pp. 1-5.

Tahhan, M., *Carbon Nanotube and Polyaniline Composite Actuators*, [on line], publ. Jun. 25, 2003, [retrieved on Jul. 15, 2003] www.iop.org.

Barisci, J., *Increased Actuation Rate of Electromechanical Carbon Nanotube Actuators Using Potential Pulses With Resistance Compensation*, [on line], publ. Jun. 25, 2003, [retrieved on Jul. 15, 2003] www.iop.org.

Baughman, R., *Carbon Nanotube Artificial Muscles*, [on line] [retrieved Jul. 15, 2003], www.pa.msu.edu/cmp/csc.

Kozlov, M. *Engineering of Carbon Nanotube Actuators and Tools for their Characterization*, Session F36— General Poster Session I [on line][]retreivedJul. 15, 2003], www.eps.org.

Sippel, J. *Nanotube Nano-actuators*, Session Q25—Focus Session: Multifunctional Nanotube Composites [on line] [retrieved Jul. 15, 2003], www.eps.org.

Dalton, A. *Multifunctional Carbon Nanotube Fiber Composites for Energy Harvesting and Mechanical Actuation*, Session 025—Focus Session:Multifunctional Nanotube Composites [on line] [retrieved Jul. 15, 2003], www.eps.org.

*Carbon Nanotube Bimorph Actuators and Force Sensors*, NASA's Jet Propulsion Laboratory, [on line] [retrieved Jul. 15, 2003] www.nasatech.com.

* cited by examiner

US 8,088,506 B2

FLUID CONSUMING BATTERY WITH FLUID REGULATING SYSTEM

CROSS-REFERENCE TO RELATED APPLICATIONS

This application claims the benefit of U.S. Provisional Application No. 60/525,326, filed Nov. 26, 2003.

BACKGROUND

This invention relates to fluid regulating systems for controlling the rate of entry of fluids, such as gases, into and out of electrochemical batteries and cells with fluid consuming electrodes, and to the batteries and cells in which such fluid regulating systems are used, particularly air-depolarized, air-assisted and fuel cells and batteries.

Electrochemical battery cells that use a fluid, such as oxygen and other gases, from outside the cell as an active material to produce electrical energy, such as air-depolarized, air-assisted and fuel cell battery cells, can be used to power a variety of portable electronic devices. For example, air enters into an air-depolarized or air-assisted cell, where it can be used as, or can recharge, the positive electrode active material. The oxygen reduction electrode promotes the reaction of the oxygen with the cell electrolyte and, ultimately the oxidation of the negative electrode active material with the oxygen. The material in the oxygen reduction electrode that promotes the reaction of oxygen with the electrolyte is often referred to as a catalyst. However, some materials used in oxygen reduction electrodes are not true catalysts because they can be at least partially reduced, particularly during periods of relatively high rate discharge.

One type of air-depolarized cell is a zinc/air cell. This type of cell uses zinc as the negative electrode active material and has an aqueous alkaline (e.g., KOH) electrolyte. Manganese oxides that can be used in zinc/air cell air electrodes are capable of electrochemical reduction in concert with oxidation of the negative electrode active material, particularly when the rate of diffusion of oxygen into the air electrode is insufficient. These manganese oxides can then be reoxidized by the oxygen during periods of lower rate discharge or rest.

Air-assisted cells are hybrid cells that contain consumable positive and negative electrode active materials as well as an oxygen reduction electrode. The positive electrode can sustain a high discharge rate for a significant period of time, but through the oxygen reduction electrode oxygen can partially recharge the positive electrode during periods of lower or no discharge, so oxygen can be used for a substantial portion of the total cell discharge capacity. This means the amount of positive electrode active material put into the cell can be reduced and the amount of negative electrode active material can be increased to increase the total cell capacity. Examples of air-assisted cells are disclosed in U.S. Pat. No. 6,383,674 and U.S. Pat. No. 5,079,106.

An advantage of air-depolarized, air-assisted and fuel cells is their high energy density, since at least a portion of the active material of at least one of the electrodes comes from or is regenerated by a fluid (e.g., a gas) from outside the cell.

A disadvantage of these cells is that the maximum discharge rates they are capable of can be limited by the rate at which oxygen can enter the oxygen reduction electrode. In the past, efforts have been made to increase the rate of oxygen entry into the oxygen reduction electrode and/or control the rate of entry of undesirable gases, such as carbon dioxide, that can cause wasteful reactions, as well as the rate of water entry or loss (depending on the relative water vapor partial pressures outside and inside the cell), that can fill void space in the cell intended to accommodate the increased volume of discharge reaction products or dry the cell out, respectively. Examples of these approaches can be found in U.S. Pat. No. 6,558,828; U.S. Pat. No. 6,492,046; U.S. Pat. No. 5,795,667; U.S. Pat. No. 5,733,676; U.S. Patent Publication No. 2002/0150814; and International Patent Publication No. WO 02/35641. However, changing the diffusion rate of one of these gases generally affects the others as well. Even when efforts have been made to balance the need for a high rate of oxygen diffusion and low rates of $CO_2$ and water diffusion, there has been only limited success.

At higher discharge rates, it is more important to get sufficient oxygen into the oxygen reduction electrode, but during periods of lower discharge rates and periods of time when the cell is not in use, the importance of minimizing $CO_2$ and water diffusion increases. To provide an increase in air flow into the cell only during periods of high rate discharge, fans have been used to force air into cells (e.g., U.S. Pat. No. 6,500,575), but fans and controls for them can add cost and complexity to manufacturing, and fans, even micro fans, can take up valuable volume within individual cells, multiple cell battery packs and devices.

Another approach that has been proposed is to use valves to control the amount of air entering the cells (e.g., U.S. Pat. No. 6,641,947 and U.S. Patent Publication No. 2003/0186099), but external means, such as fans and/or relatively complicated electronics can be required to operate the valves.

Yet another approach has been to use a water impermeable membrane between an oxygen reduction electrode and the outside environment having flaps that can open and close as a result of a differential in air pressure, e.g., resulting from a consumption of oxygen when the battery is discharging (e.g., U.S. Patent Publication No. 2003/0049508). However, the pressure differential may be small and can be affected by the atmospheric conditions outside the battery.

In view of the above, an object of the present invention is to provide an electrochemical battery cell with a fluid consuming electrode (such as an oxygen reduction electrode) with a fluid regulating system that allows high rate discharge of the cell with minimal capacity loss during periods of low rate and no discharge.

Another object of the invention is to provide a battery cell with a fluid consuming electrode that has a gas regulating system that responds to the relative need for fluid to support cell discharge at various rates.

It is a further object of the invention to provide a fluid regulating system for a cell with a fluid consuming electrode that consumes little or none of the cell discharge capacity to operate the fluid regulating system.

Yet another object of the invention is to provide a cell and a battery with a fluid regulating system that is economical to manufacture and requires little or no additional volume in the cell or battery.

SUMMARY

The above objects are met and the above disadvantages of the prior art are overcome by the use of a fluid regulating system in a battery or cell to adjust the rate at which the fluid can reach the cell's fluid consuming electrode. The regulating system responds to changes in the cell potential. A potential is applied across an actuator, which can open and close a valve, according to the changes in cell potential.

Accordingly, one aspect of the present invention is an electrochemical battery cell comprising a fluid consuming electrode, a second electrode, a housing with one or more fluid entry ports for the passage of a fluid into the cell and a fluid regulating system. The fluid regulating system includes a valve for adjusting the rate of passage of the fluid into the fluid consuming electrode and an actuator that is capable of a dimensional change with a change in a potential applied across the actuator to operate the valve.

A second aspect of the invention is an electrochemical battery cell comprising an oxygen reduction electrode, a second electrode, a housing with one or more oxygen entry ports for the passage of oxygen into the cell and an oxygen regulating system. The oxygen regulating system includes a valve for adjusting the rate of passage of the oxygen into the oxygen reduction electrode and an actuator that is capable of a dimensional change with a change in a potential applied across the actuator to operate the valve. The dimensional change is a bending, straightening, elongating and/or shortening of the actuator.

A third aspect of the invention is a battery with at least one electrochemical cell comprising a fluid consuming electrode, a housing with at least one fluid entry port for passage of a fluid into the cell and a fluid regulating system. The fluid regulating system includes a valve for adjusting the rate of passage of the fluid into the air electrode and an actuator that is capable of a dimensional change with a change in a potential applied across the actuator to operate the valve.

These and other features, advantages and objects of the present invention will be further understood and appreciated by those skilled in the art by reference to the following specification, claims and appended drawings.

Unless otherwise specified, the following definitions and methods are used herein:
 the air side or surface of an internal cell component (e.g., an air electrode or separator) is the side or surface that faces toward the air distribution space within the cell;
 a dimensional change of an object includes a change in at least one of the length, width, depth, shape and volume of the object;
 a fluid consuming electrode is an electrode that uses a fluid from outside the cell housing as an active material; and
 a non-flow inducing valve is a valve that is not a component of a device, such as a fan or a pump, used to force fluid into the cell.

Unless otherwise specified herein, all disclosed characteristics and ranges are as determined at room temperature (20-25° C.).

DESCRIPTION

Figure 1A:
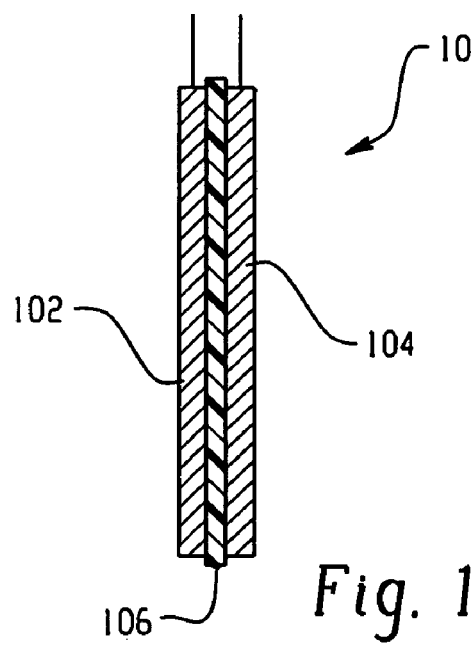
FIG. 1A is a cross sectional side view of an embodiment of a capacitive actuator that can be used in a fluid regulating system.

An embodiment of the invention is an electrochemical battery cell that uses a fluid (such as oxygen or another gas) from outside the cell as an active material for one of the electrodes. The cell has a fluid consuming electrode, such as an oxygen reduction electrode. For example, the cell can be an air depolarized cell, an air-assisted cell or a fuel cell. The cell has a fluid regulating system for adjusting the rate of passage of fluid to the fluid consuming electrode (e.g., the air electrodes in air-depolarized and air-assisted cells), to provide a sufficient amount of the fluid from outside the cell for discharge of the cell at high rate or high power, while minimizing entry of fluids into the fluid consuming electrode and water gain or loss into or from the cell during periods of low rate or no discharge.

An ideal fluid regulating system will have a fast response to changes in cell potential, a long cycle lifetime, a low operating voltage that is well matched to the cell voltage range on discharge, and a high efficiency. In addition, the ideal regulating system will have a low permeability to the fluids being managed in the closed position, open and close in proportion to the need for the active fluid in the cell, require only a very small amount of the total cell discharge capacity, have a small volume and be easy and inexpensive to manufacture and incorporate into the cell.

The invention is exemplified below by air depolarized cells with oxygen reduction electrodes, but the invention can also be used in cells with other types of fluid consuming electrodes, such as fuel cells, which can use a variety of gases from outside the cell housing as the active materials of one or both of the cell electrodes.

In an air depolarized cell the air regulating system is disposed on the air side of the oxygen reduction electrode (i.e., on or part of the surface of the oxygen reduction electrode that is accessible to air from the outside of the cell). The air regulating system includes a valve and an actuator; in some embodiments a single component can serve as both the valve and the actuator. The cell potential is applied across the actuator so that a change in cell potential (i.e., the voltage measured between the cell's negative and positive active materials) can cause movement of the actuator to open or close the valve, depending upon whether the change in potential is a decrease or increase. In this way, the lower the cell voltage (and the greater the need for oxygen to support the discharge rate or power requirements), the more the valve will open to increase the rate of entry of oxygen into the oxygen reduction electrode. Conversely, the higher the cell voltage (and the less the need for oxygen), the more the valve will close, reducing not only the rate of entry of oxygen, but also reducing the rate of entry of undesirable gases (e.g., carbon dioxide) and the rate of entry or loss of water (depending upon the relative partial pressures of water in the air inside vs. outside the cell).

The actuator is made from a flexible material that can deform as a result of internal stress or strain to apply sufficient force to operate the valve. Internal stress and strain can be created by a physical change within the actuator, such as a nonuniform volume change, or by a change in distribution of electrical charge within or on the surfaces of the actuator. Deformation of the actuator can, for example, be bending, straightening, elongation or shortening. The flexible member can be in the form of a sheet, bar or rod.

An example of a nonuniform volume change within the actuator is a relative increase in volume on one side of the actuator relative to the volume on the other side, such as when the volume increases on one side and decreases on the other, or when the volume increases on both sides but more on one side than on the other. In such instances the actuator can bend away from the side with the greater volume increase.

Nonuniform changes in volume can result from the movement of ions within the actuator, induced by changes in a potential applied across the actuator. For example, nonuniform changes in volume can occur when a relatively high concentration of ions of one size is created in one area of the actuator and a relatively high concentration of ions of a different size is created in another area. Areas of high ion concentration can be created and changed in a number of ways.

Figure 1B:
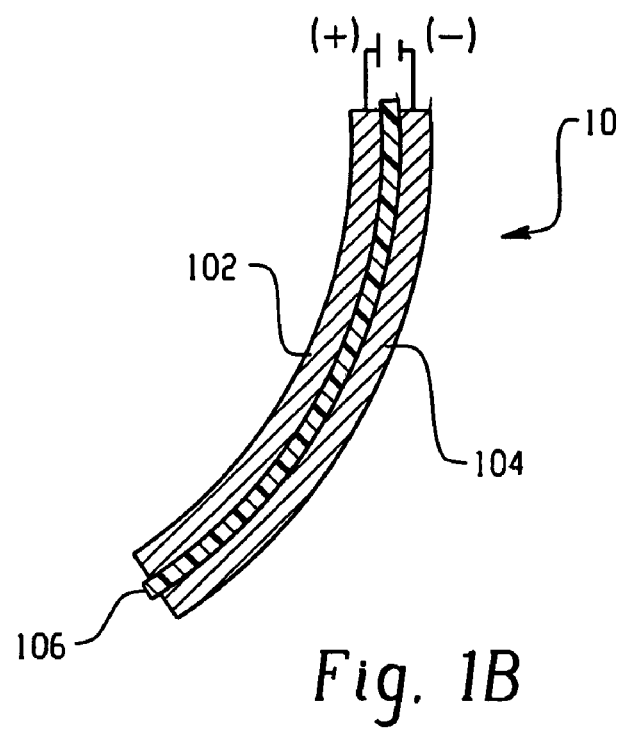
FIG. 1B is a cross sectional side view of the actuator shown in FIG. 1A with a potential applied across the actuator.
Figure 1C:
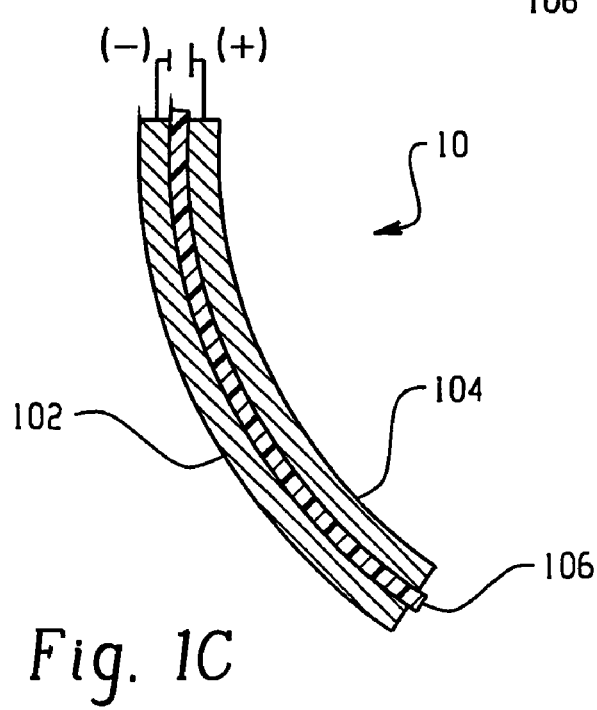
FIG. 1C is a cross sectional side view of the actuator shown in FIG. 1A with a potential applied across the actuator in a direction opposite that in FIG. 1B.

One way to create and change concentrations of ions within the actuator is by the use of a capacitive change, where a charge at (on or near) one surface of a relatively thin, flat actuator is changed. This type of actuator is referred to below as a capacitive actuator. In an example of a capacitive actuator 10, such as shown in FIGS. 1A, 1B and 1C, the actuator 10 behaves as a double-layer capacitor, with charges on the opposite surfaces, electrode layers 102, 104, changing when a potential is applied across those surfaces, with little or no faradaic reaction within the actuator. In FIG. 1A the capacitive actuator 10 has no or a zero potential applied, in FIG. 1B a potential is applied in one direction, and in FIG. 1C a potential is applied in the opposite direction. When a positive charge is applied to one surface and a negative charge to another surface of an ionically conductive material containing a dissolved salt, negative ions can migrate to and concentrate in an area adjacent to the applied positive charge, and positive ions can migrate to and concentrate in an area adjacent to the applied negative charge. Thus, changing the potential between the two sides of the actuator can change the degree of concentration of oppositely charged ions, with a corresponding change in volume in each of those areas of concentration, depending on the relative sizes of the negative and positive ions, and the amount of bending can be proportional to the change in cell potential.

The separator layer 106 of the actuator 10 is electrically nonconductive and ionically conductive, so that the salt ions can flow through the separator. Materials known as separator materials for electrochemical battery cells and capacitors can be used. Examples include woven and nonwoven fabrics, microporous membranes and polymer electrolyte materials.

The electrode layers 102, 104 of a capacitive actuator 10 can be made from a number of types of materials. Examples of electrode types for capacitive actuators include hydrogels that undergo phase transitions accompanied by volume changes in response to chemical or electrochemical stimuli (e.g., a hydrogel comprising a polyacrylate), dielectric polymers that undergo deformation when a voltage is applied across the film (e.g., made from silicones or acrylics) and carbon nanotubes that undergo bond elongation and shortening depending on electrochemically induced surface charges. In embodiments using carbon nanotubes, ions of opposite charge and different ionic radii can move between the conductive nanotubes of the electrodes, resulting in different volume changes within the electrodes on opposite sides of the actuator. If desired the electrical conductivity of the electrolyte layers can be improved by adding particles of highly conductive materials or applying a thin coating of highly conductive material to the outer surfaces of the electrodes, e.g., by vapor deposition of metals. The electrode layers can also include a binder to hold the particulate electrode materials together and adhere the electrode layers to the separator layer.

The electrolyte includes a solvent that is compatible with the separator and electrode materials of the actuator. The salt is soluble in the solvent, providing anions and cations that are sufficiently different is size that, in the salt concentration in the actuator, will provide the volume changes in the electrolyte layers necessary to cause the desired bending, straightening, lengthening and shortening of the actuator.

An example of an actuator comprising carbon nanotubes is disclosed by Baughman et al. in "Carbon Nanotube Actuators", *Science*, vol. 284, 21 May 1999, pages 1340-1344. This type of actuator uses electrolyte-filled carbon single-walled nanotube sheets as electrodes. The sheets contain arrays of nanofibers, such as entangled nanotubes or nanotube bundles. Two nanotube fiber sheets are adhered to the opposite surfaces of a sheet of ionically conductive, electrically nonconductive material. When a direct current potential is applied to actuator electrodes and the actuator sheet is submerged in an aqueous NaCl electrolyte bath, the actuator bends. The amount and direction of bending is dependent on the difference in the electrically induced expansion of the opposite actuator electrodes, and the bending is reversible. Actuator response is approximately linear with an applied voltage between −0.4 and +0.1 volt. Actuators will also operate in other electrolyte solutions, such as aqueous solutions of $H_2SO_4$, $LiClO_4$ in acetonitrile or propylene carbonate, and aqueous KOH.

Such carbon nanotube actuators can be made using single-walled nanotubes, available as an aqueous suspension from Tubes@Rice, Rice University, Houston, Tex., USA. The nanotube suspension is filtered (e.g., by vacuum filtration through a PTFE filter with 5 μm pores) to leave a sheet of highly entangled nanotube bundles over the clear funnel area. The sheet is washed with deionized water and then methanol to remove residual NaOH and surfactant. After drying under continued vacuum purge, the sheet is peeled from the filter. Strips of the nanotube sheet are cut and adhered to both surfaces of an ionically conductive separator layer (e.g. a polyvinyl chloride film), and a suitable electrolyte salt solution is added to the actuator sheet. The composition of the separator layer, electrolyte solvent and salt can be selected according to the type of cell in which the actuator is to be used. Other carbon nanoparticles, such as nanoflasks, could be substituted for nanotubes.

A capacitive actuator can also be made from a gold nanoparticle film, as disclosed by Raguse et al. in "Nanoparticle Actuators", *Advanced Materials*, vol. 15, no. 11, Jun. 5, 2003, p. 922-926. The actuator is formed by crosslinking gold nanoparticles having an average diameter of about 16 nm with short bifunctional molecules, such as cystamine hydrochloride. Aggregates of the gold nanoparticles formed upon addition of the cystamine hydrochloride are vacuum filtered onto a nanoporous polycarbonate track-etch (PCTE) membrane with a 200 nm nominal pore size, forming a nanoparticle film layer on the PCTE membrane. Actuator strips are cut from the composite material. In an aqueous $LiClO_4$ bath, application of a +0.6 volt potential to the nanoparticle film creates a positive charge that is balanced by the influx of $Cl^-$ anions, thus charging the double-layer capacitance and causing the nanoparticle film to swell. The swelling results in bending of the actuator. This type of actuator can operate with organic as well as aqueous electrolyte solutions.

Another way to create and change volumes of the actuator electrodes is by the use of a faradaic reaction, where an electrochemical reaction is induced within the actuator by applying or changing a voltage potential. This can require some flow of current from the cell through the actuator, using a portion of the cell's discharge capacity. This type of actuator is referred to below as a faradaic actuator. Reaction products having volumes that are different from the volumes of the reactants are produced on at least one side of the actuator. Changes in the relative concentrations of reactants and reaction products cause corresponding changes in actuator volume in that portion of the actuator where they are contained.

One example of a faradaic actuator is a bendable sheet made from a composite membrane having two electrode layers, one on each side of a separator, and each containing an electrochemically active material. This type of actuator is referred to below as a 2-electrode faradaic actuator. When the cell potential is applied across the membrane a faradaic (e.g., oxidation-reduction) reaction occurs. Because of differences in the volumes of the reactants and reaction products in one or both actuator electrodes, the ratio of the volumes of the actuator electrodes changes, causing the actuator to bend. If the faradaic reaction is reversible, the actuator can be reversibly bent. The compositions of the two electrodes can be the same or different. When the compositions are different, the oxidizable and reducible materials contained in the electrodes can be selected so the actuator will be in the closed position (e.g., straight) when the cell has a desirably high voltage and in the open position (e.g., bent) when the cell voltage is below a selected level. However, if the electrode compositions are the same, a controller circuit is used so that when the cell is at a desirably high voltage, there is no potential (i.e., a 0-volt potential) applied to the actuator.

Figure 2A:
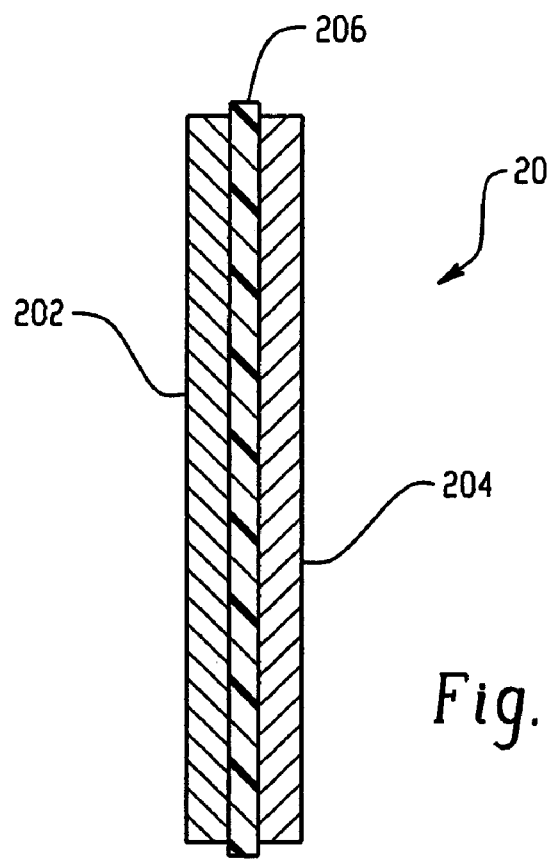
FIG. 2A is a cross sectional view of an embodiment of a 2-electrode faradaic actuator.
Figure 2B:
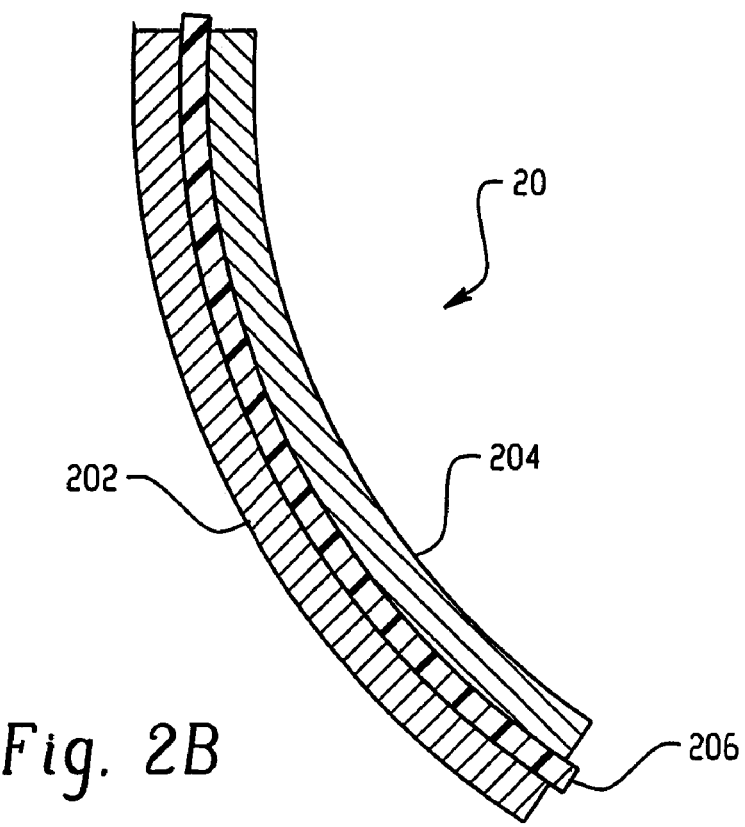
FIG. 2B is a cross sectional side view of the actuator shown in FIG. 2A with a potential applied across the actuator.

An example of 2-electrode faradaic actuator 20 is shown in FIGS. 2A and 2B. In FIG. 2A the actuator 20 is straight, and in FIG. 2B the actuator 20 is bent as a result of the volume of one electrode 202 increasing and the volume of the other electrode 204 decreasing upon the application of a potential across the actuator 20. Alternatively, the volume of one electrode 202 can increase with no change in the volume of the other electrode 204, or the volume of one electrode 204 can decrease with no change in the volume of the other electrode 202.

In a 2-electrode faradaic actuator 20 the electrodes 202, 204 can contain an electrically conductive polymer film, such as a polyaniline film, that can undergo reversible oxidation and reduction, and a separator 206 impregnated with electrolyte between the electrodes 202, 204.

Another type of faradaic actuator is 1-electrode faradaic actuator. This type of actuator is a bendable sheet comprising a material that can be reversibly oxidized and reduced contained in a coating on one side of a flexible, essentially inert substrate. Oxidation and reduction of the material in the coating result in volumetric changes, causing the actuator to bend.

In one embodiment of a 1-electrode faradaic actuator, the actuator coating can function as an oxygen reduction electrode in the cell. The actuator can be the sole oxygen reduction electrode in the cell, or it can be part of or combined with another oxygen reduction electrode. The reversibly reducible material is a material that can react directly with the active negative electrode material and be reoxidized by oxygen in the air that enters the cell. In an air regulating system with such an actuator, the actuator can function as part of the valve, as described below.

In an example of this type of 1-electrode faradaic actuator, the particulate reversibly reducible material is held together and adhered to the substrate by a binder. A conductive material can also be included in the electrode layer to improve its electrical conductivity. When the air regulating system is in a cell, the actuator electrode layer is on the air side of the substrate and is in ionic communication with the negative electrode of the cell. The negative electrode of the cell functions as one electrode of the actuator, so a second actuator electrode layer is not applied to the substrate.

When the cell is an alkaline zinc/air cell, the reversibly reducible material can be a manganese oxide, preferably one with a lower potential vs. zinc than an EMD or a CMD that would normally be used in the positive electrode of a primary alkaline $zinc/MnO_2$ cell so the actuator will operate in the normal voltage range of the zinc/air cell (e.g., 0.9 to 1.4 volts). Other metal oxides, such as copper oxide, and conductive polymers, such as polyaniline, are examples of reversibly reducible materials.

Yet another type of actuator is an electrostatic actuator. An electrostatic actuator moves as a result of changes in electrostatic attraction between two parts of the actuator. An electrostatic actuator can respond quickly to a change in potential across the actuator, with little or no flow of current.

In one embodiment, the electrostatic actuator includes two electrically conductive layers separated by a thin insulating layer. At least one of the conductive layers is thin and bendable, and it is initially biased in a curved shape by a stress gradient produced during manufacture. A portion of this first conductive layer is disposed against the insulating layer and second conductive layer, and another portion of the first conductive layer is bent away to function as a flap or a lid. The second conductive layer and insulating layer contain an aperture positioned under the curved portion of the first conductive layer. Applying a potential across the conductive layers results in an electrostatic force between them, and the flap portion of the first conductive layer is drawn toward the second conductive layer, closing the aperture. The greater the cell voltage, the greater the applied potential and the more the flap closes.

In another embodiment, the electrostatic actuator comprises a layer of a dielectric elastomeric film sandwiched between two electrically conductive layers. Applying a potential across the actuator induces a positive charge on one of the conductive layers and a negative charge on the other. The attractive force between the positive and negative layer squeezes the intermediate elastomeric layer, causing it to expand perpendicular to the attractive force. An example of such an electrostatic actuator is disclosed by Bar-Cohen in "Electroactive Polymers as Artificial Muscles—Capabilities, Potentials and Challenges", *Handbook on Biometrics*, Yoshihito Osada (Chief Ed.), Section 11, Chapter 8, paper # 134, NTS Inc., August 2000. If the actuator is in the form of a bar, the expansion and contraction of the elastomeric layer resulting from increases and decreases, respectively, in the attractive force between the two conductive layers, can cause corresponding lengthening and shortening of the bar.

Examples of solid state actuators, including materials, structures and methods of manufacturing are disclosed by Shahinpoor et al. in U.S. Patent Application Publication No.

2002/0050454, published May 2, 2002, the entire disclosure of which is incorporated by reference.

Actuators may also be composite actuators, in which features of different types of actuators are combined. For example, two actuator electrodes can be made of different materials, with one electrode being capacitive and the other faradaic.

As described above, the movement of an actuator that moves in response to a change in electrical potential across the actuator can be used to operate (open and close) the valve portion of the air regulating system within the cell. The valve can be of any suitable form that can be operated by movement of the actuator.

For example, the valve can be an element with at least one area of relatively high oxygen permeability surrounded by an area of relatively low oxygen permeability and having a moveable covering of relatively low oxygen permeability covering the high oxygen permeability area. The covering can be moved to expose at least a portion of the high permeability area to access by air from outside the cell. The more air that can reach the high permeability area, the more "open" the valve is, and the less air that can reach the high permeability area, the more "closed" the valve is. How open or closed the valve can be a function of the size of the exposed surface area of the high permeability area and the size of the opening created for air to move through get to that area. Either or both of these factors can be affected by moving the covering. The valve may have one or a plurality of high permeability areas, each surrounded by a low permeability area. The materials of both layers can be selected to provide the desired combination of oxygen, carbon dioxide and water permeabilities.

In one embodiment a single covering may be used, in conjunction with either one or a plurality of high permeability areas. In another embodiment multiple coverings may be used in conjunction with either one or a plurality of high permeability areas. In yet another embodiment a plurality of coverings may be formed in a single component, with each covering associated with a portion of a single high permeability area, or with each covering associated with a separate high permeability area.

One example of a valve covering is a flap that can be moved away from and towards the high permeability surface. In the fully closed position the flap(s) may cover the entire surface of the high permeability area(s), or only a portion of the high permeability area(s) may be covered, e.g., to provide sufficient air access to maintain a desired minimum cell voltage. The flap can be opened and closed by the motion of a separate actuator, or the flap may be part of the actuator itself.

The flap can be disposed against the air side of the oxygen reduction electrode. In this case the flap can bend away from the oxygen reduction electrode to expose more of the high permeability area by opening into a portion of an air distribution space. Alternatively, the flap can be disposed against the inner surface of that portion of the housing in which an air entry port is located. In this case the flap can bend into an air distribution space between the actuator and the oxygen reduction electrode. The flap may be a flexible sheet disposed over a single high permeability area of the valve, or it may be part of a larger sheet in which the flap is defined by a throughout in the sheet that provides a hinge at which the flap can open away from the surrounding low permeability portion of the sheet.

The sheet may be generally held in place in any suitable manner that allows the flap(s) to open. For example, a large sheet may be held by force or pressure between two cell components, such as between peripheral portions of the oxygen reduction electrode and the inside bottom surface of the can in a button type air cell. A portion of the sheet may be affixed to the low permeability area surrounding the high permeability area(s), by various means, such as pressure bonding, melt bonding and adhesive bonding.

The high permeability area of the valve may be one layer and the low permeability layer may be another layer of a composite structure. For example, a high permeability film may be partially coated with a low permeability material, leaving one or more areas of the high permeability film exposed. In another example, a solid sheet of high permeability material may be laminated to a sheet of low permeability material having cutouts to expose discrete high permeability areas within the cutout areas.

In another embodiment, the high permeability area of the valve may be an aperture in a plate or sheet of low permeability material. In such an embodiment the covering can be disposed over the aperture when the valve is in the closed position. Alternatively, the low permeability sheet may be the sheet in which one or more flaps are formed in the sheet by partially cutting through the sheet around the flap area; the aperture is created when the flap opens. This embodiment has the advantage of minimizing the number of component parts of the air regulating system.

Figure 3A:
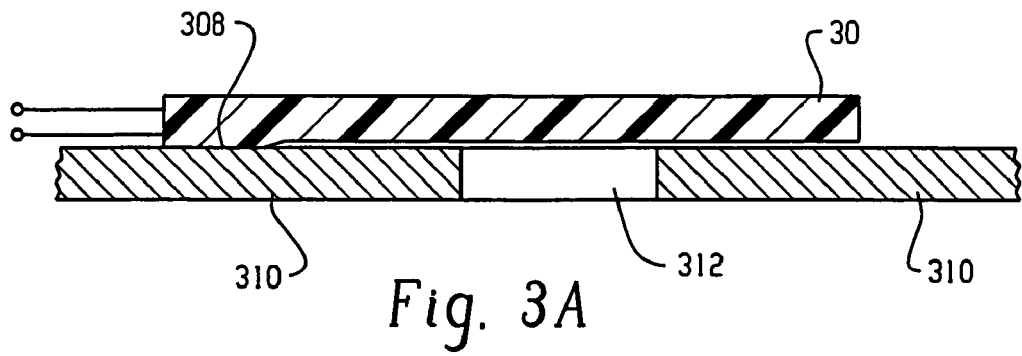
FIG. 3A is a cross sectional side view of an embodiment of a valve with a flap in a closed position.
Figure 3B:
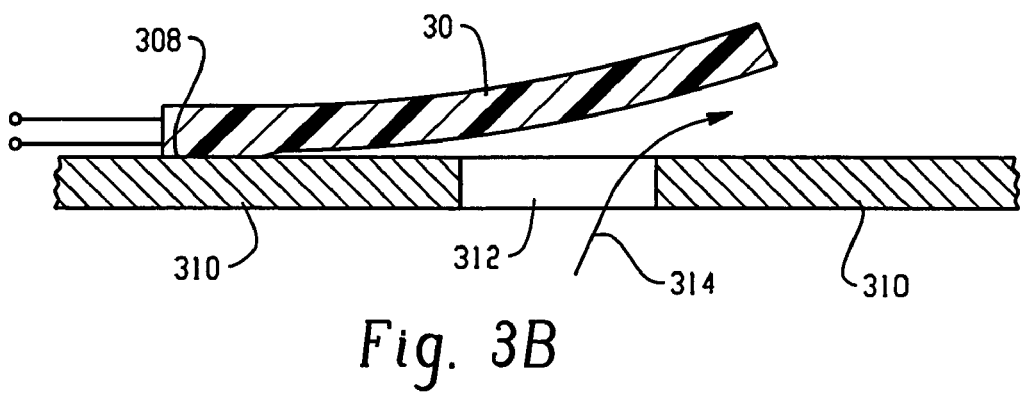
FIG. 3B is a cross sectional side view of the valve shown in FIG. 3A with the flap in an open position.
Figure 4A:
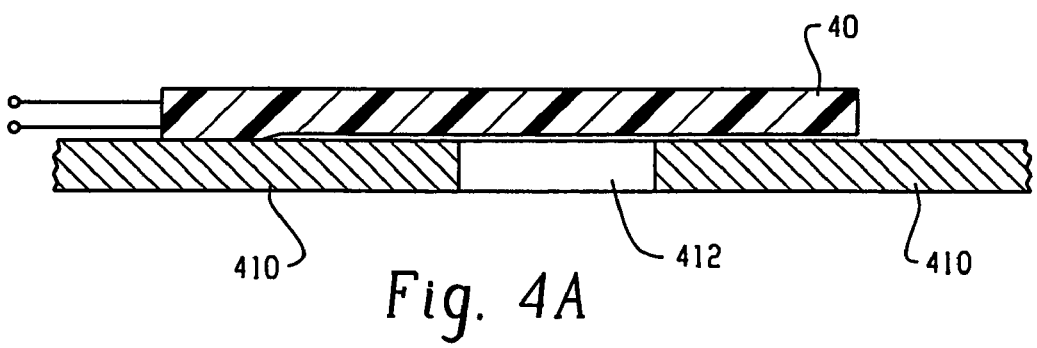
FIG. 4A is a cross sectional side view of an embodiment of a valve with a flap comprising a slit in a closed position.
Figure 4B:
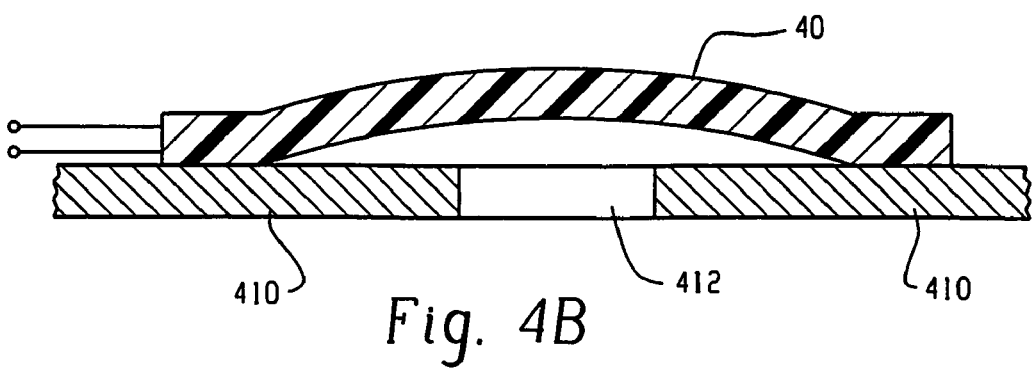
FIG. 4B is a cross sectional side view of the valve shown in FIG. 4A with the flap in an open position.
Figure 4C:
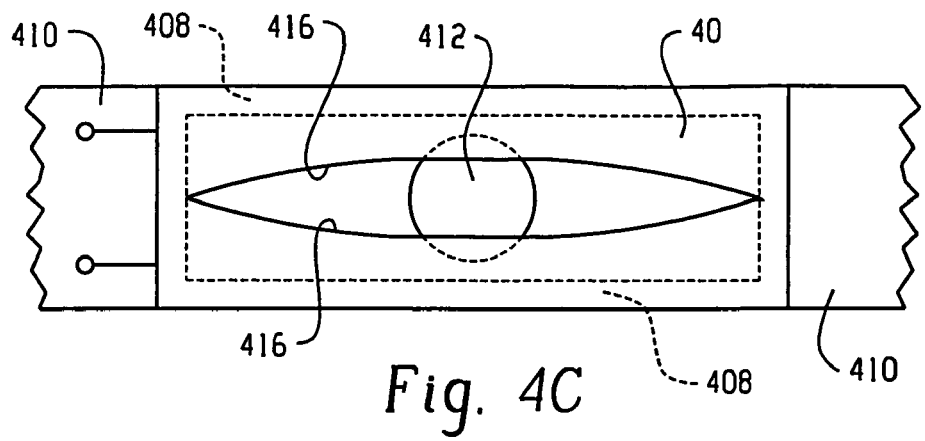
FIG. 4C is a top plan view of the valve shown in FIG. 4B with the flap in an open position.

Examples of valves using one or more flaps are shown in FIGS. 3A and 3B; FIGS. 4A, 4B and 4C; and FIGS. 5A, 5B and 5C.

In FIGS. 3A and 3B a relatively small, low permeability actuator sheet 30 is anchored at one or more points 308 to a low permeability sheet 310 near an aperture 312. The actuator sheet 30 is in the form of a flap that covers the aperture 312 when in the closed position (FIG. 3A) and bends to an open position (3B) to uncover at least part of the aperture 312 and allow air to flow through the aperture 312, as indicated by arrow 314.

In FIGS. 4A, 4B and 4C a low permeability actuator sheet 40 is adhered to a low permeability sheet 410 near an aperture 412. The actuator sheet 40 is adhered to the low permeability sheet 410 in a pattern 408 that completely surrounds the aperture 412. A flap is formed by a cut-through, in the form of a slit 416, made through the actuator sheet 40 where the actuator sheet 40 covers the aperture 412. In the closed position (FIG. 4A) the actuator sheet 40 is flat and there is little or no opening at the slit 416, and in the open position (FIGS. 4B and 4C) the slit 416 allows the actuator sheet 40 to bend, so that the portions of the actuator sheet 40 on both sides of the slit 416 function as a flap to open the aperture 412.

Figure 5A:
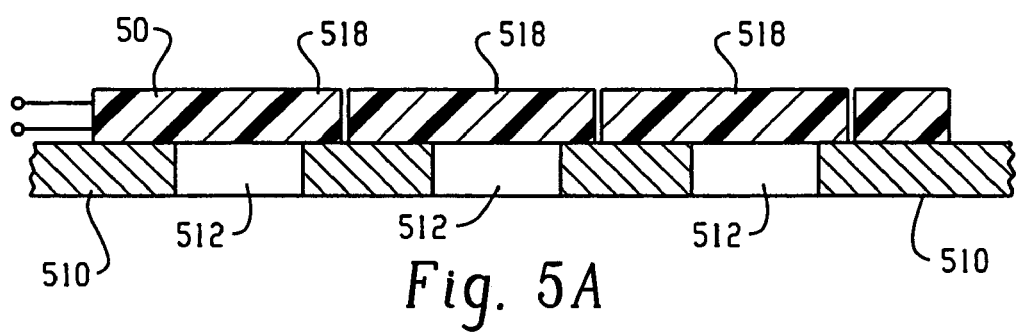
FIG. 5A is a cross sectional side view of an embodiment of a valve with a plurality of apertures and corresponding flaps in a closed position.
Figure 5B:
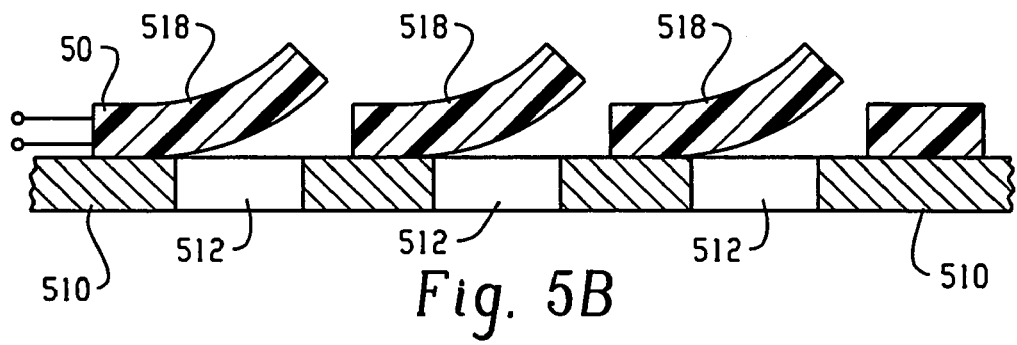
FIG. 5B is a cross sectional side view of the valve shown in FIG. 5A with the flaps in an open position.
Figure 5C:
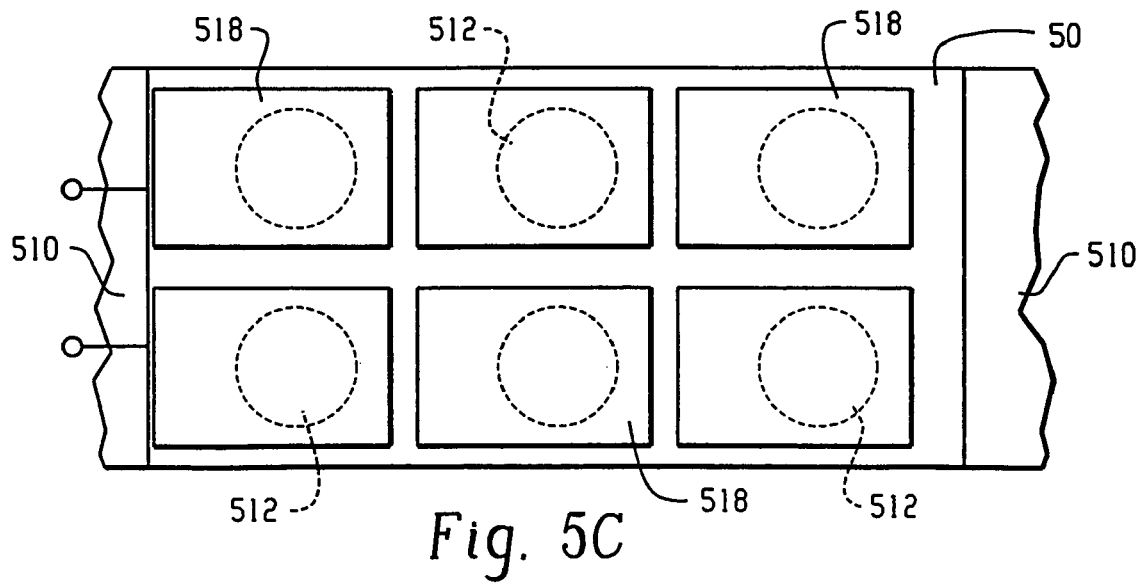
FIG. 5C is a top plan view of the valve shown in FIG. 5A with the flaps in an closed position.

In FIGS. 5A, 5B and 5C a relatively large actuator sheet 50 covers a plurality of apertures 512 in a low permeability plate or sheet 510. A plurality of flaps 518 is formed in the sheet 510, with one flap 518 over each aperture 512, as shown in the top view (FIG. 5C). In the closed position (FIG. 5A) each flap 518 covers the corresponding aperture 512, and in the open position (FIGS. 5B and 5C) each flap 518 bends to uncover at least a portion of the corresponding aperture 512. The actuator sheet 50 may be adhered to the low permeability sheet 510, either at selected points or generally at the interface of the actuator sheet 50 and high permeability sheet 510 outside the flap areas 518.

In another example of a valve having at least one flap (not shown), the actuator sheet can have a single flap that covers a plurality of apertures. As the flap continues to bend toward a fully open position, more apertures are uncovered, thereby increasing the area through which air can flow through the high permeability sheet or plate.

Another example of a valve covering is two or more adjacent plates, each having one or more apertures that can be aligned to varying degrees to change the size of the opening therethrough. The plates are generally relatively rigid to provide a suitable closure in the closed position and are movable with respect to one another, such as by sliding one of the plates horizontally across the other, by rotating one of the plates about an axis or by sliding multiple plates arranged in the form of an iris. In such embodiments the high permeability areas of the valve may be portions of one or more high permeability films adjacent to or affixed to a surface of one of the plates, or the high permeability areas may simply be the openings through the adjacent plates formed when the apertures are aligned.

The corresponding apertures in adjacent plates may be of the same sizes and shapes, or they may be different. For example, the apertures can be circular, prismatic, wedge shaped, or they can have any other convenient shape.

Figure 6A:
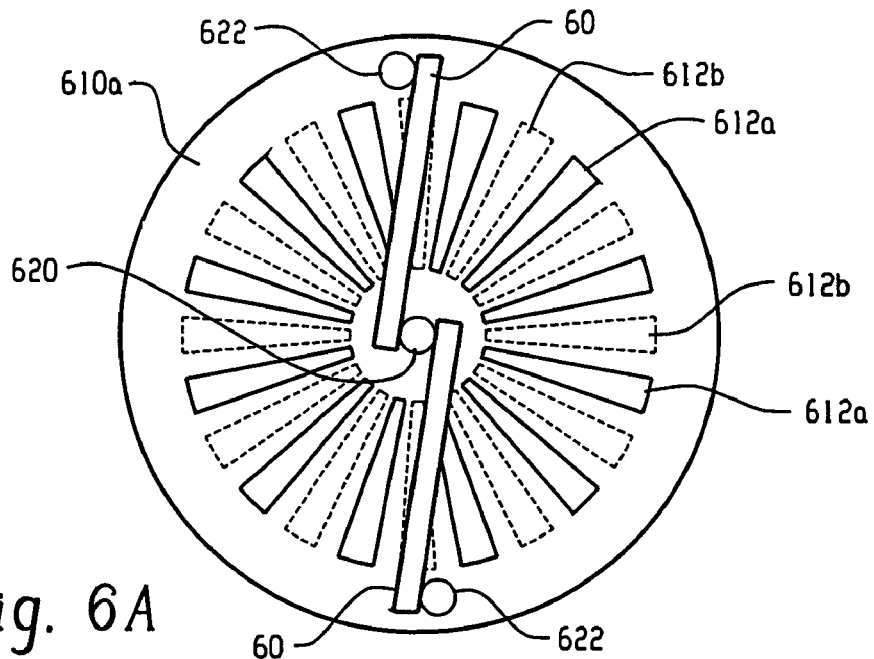
FIG. 6A is a top plan view of an embodiment of a valve comprising two plates rotatable about a common axis with the valve in a closed position.
Figure 6B:
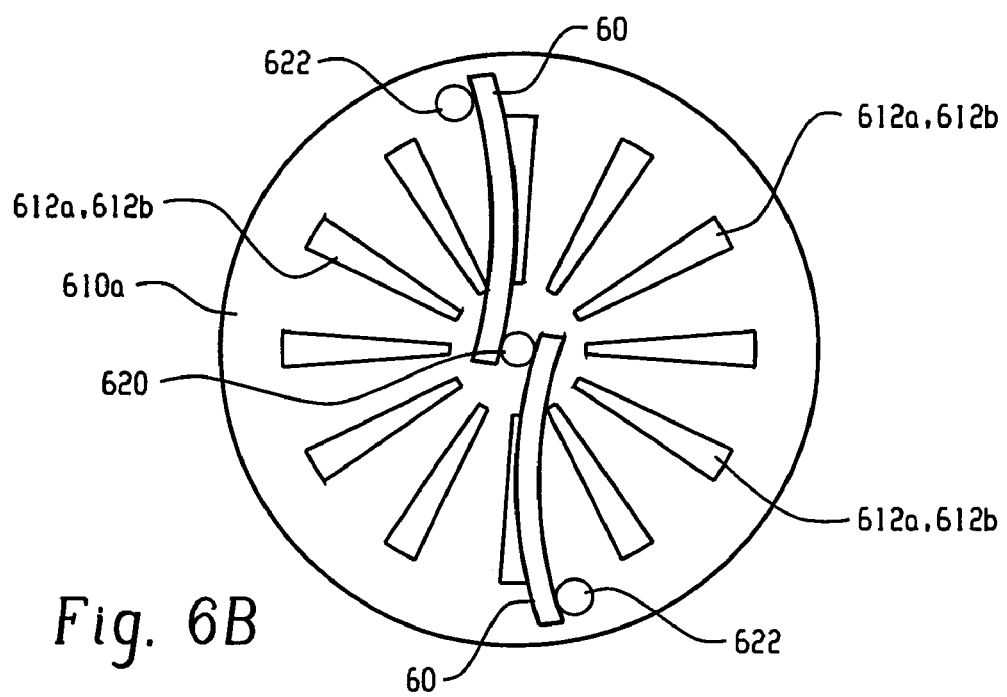
FIG. 6B is a top plan view of the valve shown in FIG. 6A with the valve in an open position.
Figure 6C:
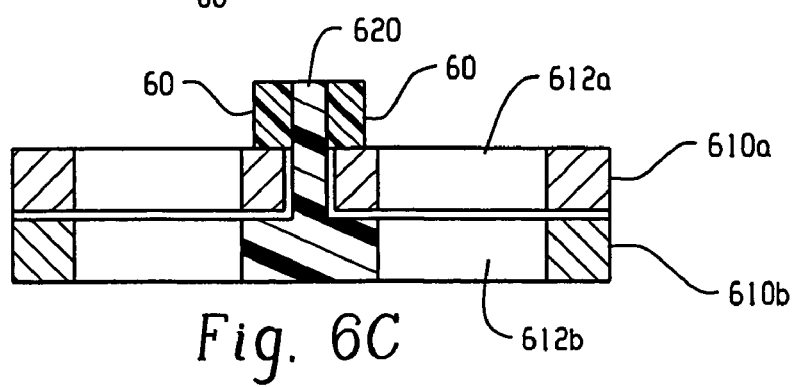
FIG. 6C is a cross sectional side view of the valve shown in FIG. 6B with the valve in an open position.

An example of a valve comprising two plates that are rotatable about a common axis is shown in FIGS. 6A, 6B and 6C. Both plates 610a, 610b are low permeability. The top and bottom plates 610a, 610b contain apertures 612a, 612b, and the apertures 612a in one plate 610a are the same in size, shape and location as the apertures 612b in the other plate 610b. In the closed position (FIG. 6A) the plates 610a, 610b are aligned so that the apertures 612a in one plate 60a are completely covered by the other plate 610b, and in the open position (FIGS. 6B and 6C) the apertures 612a in one plate 610a are at least partially aligned with the apertures 612b in the other plate 610b to create apertures through both plates. In this example there are two actuators 60, each affixed to a central axis 620 at one end and disposed against a projection 622 from the adjacent top plate 610a at the other end. When the actuators 60 bend, they push against the projections 622 to rotate the top plate 610a relative to the bottom plate 610b about the central axis 620.

In another example of a valve comprising two adjacent plates, at least one of which is slidable, edges of the adjacent plates can be angled or shaped so that when one plate slides relative to the other, an opening is created, and the size of the opening changes as the sliding continues. The edges of the plates can be straight but simply angled with respect to one another, or the edges can be notched in a convenient manner.

Actuator sheets can be made by any suitable manufacturing process. High speed printing processes can be used to manufacture actuator film sheets. Rotary die cutting can be used to make cuts in the sheets to form flaps.

Another embodiment of a valve is a plug that is pushed against the inside surface of the container wall in which an air access port is located, thereby blocking the air access port. The plug can be made from a material that has a low permeability to oxygen, carbon dioxide and water. The plug can also be elastomeric to better conform to the container surface and the edges of the air access ports so as to better seal the ports when the valve is in the closed position. A tapered plug can be used to provide better control in opening an closing the air access port in proportion to the cell voltage.

An air regulating system can use appropriate combinations of the actuators and valves disclosed above, taking into account that the air regulating system must be stable in the internal cell environment, compatible with the desired cell performance characteristics and able to fit within the cell housing. Embodiments of various combinations of actuators and valves are disclosed below.

In some combinations of actuators and valves the actuator and valve are separate components of the air regulating system, with movement of the actuator causing the valve to open or close.

One example of an air regulating system with separate actuator and valve components is a device that has a valve in the form of a plug with low oxygen, carbon dioxide and water permeability. The plug is disposed near an air entry port in the cell housing. The actuator can move the plug against the inner surface of the cell housing to block the air entry port or move the plug away to open the port. The actuator can be in any suitable form, such as a bendable sheet or bar, or a bar or rod that can change in length.

Another example of an air regulating system with separate actuator and valve components is one in which the valve has multiple layers of low permeability, at least one of which is slidable to change the alignment of holes or other high permeability areas of the layers to open and close the valve. The actuator moves by bending and straightening or by elongating or shortening to slide at least one of the valve layers.

In other combinations of actuators and valves, the actuator is at least part of the valve. For example, the actuator can be a capacitive actuator in the form of a flexible sheet that is also the valve. The sheet is made from a material with relatively low oxygen permeability, and the sheet is cut through in a pattern to form one or more flaps. Each flap remains connected to the rest of the actuator sheet, with the area of connection functioning as a hinge, about which the flap can bend in and out of the plane of the remainder of the sheet. When the flap moves outward, an opening is created in the sheet, and the size of the opening is related to how far the flap moves. Alternatively, the actuator sheet is positioned (e.g. affixed by lamination) against a second sheet made from a low permeability material. The opening created in the actuator sheet when the flap opens outward away from the second sheet exposes at least a portion of the second high permeability sheet to provide a high permeability path by which air can flow.

In another example the actuator is also a flexible sheet with one or more flaps cut therein. The actuator sheet is adjacent to a sheet of high oxygen permeability; the two sheets may be adhered to one another. When the flaps are in the open position, the portion of the actuator sheet around the flaps also defines the high permeability area around the low permeability area of the valve.

Actuators and valves that can be used in the invention are illustrated in the following examples.

Example 1

One-electrode actuator strips were made for testing.

An electrode mixture was made by combining 75 weight percent $MnO_2$, 20 weight percent graphite and 5 weight percent polytetrafluoroethylene (PTFE). The $MnO_2$ was alkaline battery grade Electrolytic Manganese Dioxide (EMD), available from Kerr-McGee Chemical Corp., Oklahoma City, Okla., USA. The graphite was KS6 grade natural graphite powder, available from Timcal America, Westlake, Ohio, USA. The PTFE was TFE 6C grade TEFLON®, available from E. I. duPont de Nemours & Co., Chicago, Ill., USA. The ingredients were mixed lightly using a mortar and pestle.

For each actuator, sufficient mineral spirits were added to 5 grams of the mixture to so the mixture could be formed into a cohesive ball. The ball of electrode mixture was rolled using a Swest mill to form an electrode strip about 0.020 inches (0.508 mm) thick, 2 inches (5.08 cm) long and ⅜ inches (0.953 cm) wide. The electrode strip was placed between two brass plates and pressed with an applied load of 24,000 pounds (10,872 kg) to a thickness of about 0.012 inches (0.0305 mm) and then cut to about 1¼ inch (3.175 cm) long by ⅜ inches (0.953 cm) wide. The cut electrode strip weighed about 0.251 grams. A strip of nickel screen approximately 3 3/16 inches (8.096 cm) long, ⅜ inches (0.953 cm) wide and 0.0094 inches (0.239 mm) thick, weighting approximately 0.246 grams, was pressed into one surface of the cut electrode strip with 10,000 pounds (4,530 kg) force to form an actuator strip with nickel screen extending from one end. The final dimensions of the actuator strip were approximately ¼ inch (3.175 cm) long by ⅜ inches (0.953 cm) wide by 0.0146 inches (0.371 mm) thick, and the total weight was approximately 0.487 grams due to a small loss of mineral spirits during the screen embedding process.

Example 2

Two actuator strips, each made as described in Example 1, were tested to determine if they would reversibly bend and straighten when a potential was applied.

The actuator strips were prepared for testing. The strips were placed side by side, with the nickel screen sides away from each other. The extending screens were fastened together so the two actuator strips would function as a single working electrode during the testing. The actuator strips, together with a zinc reference electrode and a Pt counter electrode, were submerged in a beaker containing an aqueous KOH electrolyte solution.

The actuators were alternately discharged, then charged, both at a constant current of about 0.01278 amps, for a total of 4 discharge/charge cycles. The first discharge was for about 70 minutes in duration; subsequent discharge times and all charge times were about 80 minutes each. The actuator strips were observed. Both strips bent so the free ends moved away from each other during discharging and then straightened so the free ends moved toward each other during charging.

Example 3

After testing the two actuator strips in Example 2, the strips were subjected to additional discharge and charge cycles, each done potentiostatically at various voltage to determine at what discharge voltages the strips would and would not move apart and at what charge voltages the strips would and would not move together. The results are summarized in Table 1.

TABLE 1

| Voltage | Observations |
|---|---|
| Discharge | |
| 1.20 | Bending |
| 1.25 | Bending |
| 1.30 | Bending |
| 1.40 | No bending |
| Charge | |
| Voltage | Observations |
| 1.8 | Straightening |
| 1.6 | Straightening |
| 1.5 | Straightening |
| 1.45 | Partial straightening |
| 1.40 | Partial straightening |

The air regulating system can be located within the cell housing. This protects the air regulating system from damage. The air regulating system device will be disposed on the air side of the oxygen reduction electrode in order to effectively control the flow of air to the oxygen reduction electrode. The air regulating system can be disposed in any suitable location within the cell housing as long as it is on the air side of the oxygen reduction electrode. For example, the air regulating system can be positioned against or otherwise adjacent to the inside surface of that portion of the housing in which one or more air entry ports are located; against or otherwise adjacent to the oxygen reduction electrode; or adjacent to and on the air side of another cell component, such as a gas-permeable sheet on the air side surface of the oxygen reduction electrode. Alternatively it can be at least a part of the oxygen reduction electrode itself, as long as the valve is on the air side thereof.

The air regulating system will be positioned in such a manner that the valve can open and close in response to changes in the cell potential. For example, if the valve comprises one or more flaps, other cell components will not prevent the flaps from opening and closing. This can be accomplished by positioning the air regulating system so that the flaps open into an air distribution area between the air entry port in the housing and the oxygen reduction electrode. In some embodiments the air distribution area may be on the air side of the air regulating system, in some embodiments the air distribution area may be on the other side (i.e., the oxygen reduction electrode side) and in yet other embodiments there may be an air distribution area on both sides of the air regulating system.

The air regulating system will be electrically connected to at least the positive electrode of the cell in order for the cell potential to be applied across the air regulating system. If the air regulating system comprises a 1-electrode actuator, the single electrode will be electrically connected to only the positive electrode of the cell, but it will also be in ionic communication with the negative electrode of the cell. If the air regulating system comprises a 2-electrode actuator, one electrode will be electrically connected to the positive terminal of the cell and the other electrode will be electrically connected to the positive terminal of the cell.

Electrical connections between the actuator electrodes and the cell electrodes can be accomplished in any suitable manner that provides a reliable connection and does not result in a completed electrical path (e.g., an internal short circuit) between the cell positive and negative electrodes.

For example, one actuator electrode can be in direct physical and electrical contact with the oxygen reduction electrode, which is, or is electrically connected to, the positive terminal of the cell. In another example, an actuator electrode can be in direct contact with an electrically conductive portion of the cell housing that is in electrical contact with the positive electrode. In yet another example, an electrical lead can be used to provide electrical contact with the positive electrode.

The actuator electrode that is electrically connected to the negative electrode of the cell can be connected with an electrical lead. The electrical lead can go around or through the oxygen reduction electrode and/or the positive electrode, as long as the lead is electrically insulated therefrom.

For example, the lead connecting the actuator electrode to the negative electrode of the cell may be in the form or a wire or thin metal strip, with a dielectric material coating any parts of the lead that may otherwise come in electrical contact with the positive electrode (either directly or through another cell component, such as a conductive portion of the cell housing, a positive electrode current collector or a positive electrode electrical contact lead or spring). In another example the electrical lead to the negative electrode may be in the form of one or more thin layers of metal printed or otherwise deposited on a portion of one or more other cell components, such as surfaces of gaskets, insulators, cans, covers and the like. Layers of a dielectric material may be coated over and/or beneath the metal layers to provide the necessary insulation from the positive electrode.

The potential applied to the actuator to operate the valve of the air regulating system can originate within the cell. For example, the potential applied to the actuator can be the cell potential, as described above. The cell potential can also be changed. If a higher voltage is needed to produce a sufficient actuator dimensional change, the cell potential can be adjusted upward. Adjusting the cell potential can allow the use of different types of materials for the actuator. Increasing the cell potential can be accomplished, for example, with a control circuit, to step up the cell voltage and induce deformation of the actuator to operate the valve.

A control circuit can be used in other ways to monitor the need for oxygen and then apply a potential across the actuator to open or close the valve. For example, the control circuit can include an oxygen sensor to monitor the oxygen level in the cell, it can be used to monitor the cell voltage, and it can be used to monitor the potential of the oxygen reduction electrode against a separate reference electrode. The potential applied across the actuator can originate within the cell (e.g., the potential between the positive and negative electrodes) and be adjusted upward or downward if desired, or the potential can originate outside the cell (e.g., another cell in the battery or other suitable power source). The control circuit can be printed or otherwise applied to a cell or battery component, it can be included in an electronics chip, or any other suitable arrangement can be used.

To maximize utilization of the internal volume in cells according to the invention, a conventional cell component can be modified to function as the actuator and/or valve. An example is a button size alkaline zinc/air cell in which a 1-electrode actuator is used to open and close a valve. The cell has a housing that includes a can, a cup and a gasket that provides a seal between the can and the cup. The cell has a negative electrode comprising zinc as the active material and an electrolyte comprising an aqueous solution of potassium hydroxide. The cell has an air electrode as a positive electrode, and the air electrode also functions as an air regulating system. The zinc is disposed within the cup, which serves as the negative contact terminal of the cell. The air electrode is disposed within the can, which serves as the positive contact terminal of the cell. An electrically insulating, ionically conductive separator is disposed between the zinc electrode and the air electrode. In the bottom surface of the can is an aperture that serves as an air entry port through which air from outside the cell can enter.

The air electrode includes a manganese oxide as a reversibly reducible material that promotes the reaction of oxygen from outside the cell with the electrolyte so that the zinc in the negative electrode can be oxidized. In addition, the air electrode also contains graphite and PTFE as a binder. A metal screen current collector is pressed into the surface of the air side of the air electrode to provide good electrical contact with the can. An oxygen permeable, hydrophobic membrane is laminated to the air side of the air electrode to keep liquid electrolyte from passing from the negative electrode through the air electrode and outside the cell. Between the hydrophobic membrane and the inner surface of the can bottom is an air distribution space through which air is dispersed over a large area of the hydrophobic membrane.

In addition to serving as a current collector for the air electrode, the metal screen also serves as the flexible substrate for the actuator of the air regulating system. The air electrode mixture containing manganese oxide serves as the actuator electrode. Affixed to the air side of the air/actuator electrode is a plug made from an elastomeric material. The plug is located within the air distribution space and is aligned with the air entry port.

When the cell has a high voltage and there is sufficient oxygen available, the manganese oxide in the air/actuator electrode is at its normal high level of oxidation, and the plug is disposed against the can bottom, closing the air entry port. When the cell voltage is low and additional oxygen is needed, the metal oxide is reduced directly by the zinc. The metal oxide in the reduced state has a greater volume, causing the electrode material to swell. This in turn causes the air/actuator electrode to bend inward, pushing against the separator, and pulling the plug away from the air entry port. This allows air (and oxygen) to enter the air distribution space and permeate through the hydrophobic layer of the air electrode more quickly and allows more oxygen to be used in the cell discharge reaction. As the demand for oxygen drops, the reduced manganese oxide is reoxidized. As it is reoxidized the air/actuator electrode volume decreases, the air electrode/actuator moves back toward its high voltage position, and the plug is moved back toward the air entry port. When the cell voltage reaches a high enough level, the plug is pushed against the air entry port to close it. Thus, the size of the air entry port can be substantially increased in comparison to a cell without such an air regulating system, to better meet the needs of high rate discharge, without increasing capacity losses due to ingress of $CO_2$ or water gains or losses, particularly in extreme humidity conditions.

Air regulating systems can be incorporated into batteries in various ways, depending on the type and design of the air regulating system, the cell and the battery. The invention is described above with respect to a battery in which the valve, actuator and control circuit are contained within the cell housing, where, for example, otherwise empty space between the cell housing and the oxygen reduction electrode. However, other embodiments of the invention are contemplated in which the valve, actuator, control circuit or any combination thereof can be disposed outside the cell, such as between the external surface of the cell housing and a battery jacket or case. The minimal volume requirements for the valve and actuator make such embodiments possible in batteries with little space available between the cell and the jacket or case.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. An electrochemical battery cell comprising a first fluid consuming electrode, a second electrode, a housing comprising one or more fluid entry ports for the passage of a fluid into the cell and a fluid regulating system, wherein the fluid regulating system comprises: a valve for adjusting the rate of passage of the fluid into the fluid consuming electrode; and an actuator that is capable of a dimensional change with a change in a potential applied across the actuator to operate the valve; wherein the actuator comprises at least a portion of the fluid consuming electrode.

2. The cell defined in claim 1, wherein the potential applied across the actuator is equal to a potential between the fluid consuming electrode and the second electrode.

3. The cell defined in claim 1, wherein the fluid regulating system further comprises a control circuit for monitoring a fluid need within the housing and applying the potential across the actuator.

4. The cell defined in claim 3, wherein the control circuit monitors a fluid content within the housing.

5. The cell defined in claim 3, wherein the control circuit monitors a potential between the fluid consuming electrode and the second electrode.

6. The cell defined in claim 5, wherein the potential applied across the actuator is greater than the potential between the fluid consuming electrode and the second electrode.

7. The cell defined in claim 3, wherein the control circuit monitors a potential between the fluid consuming electrode and a reference electrode.

8. The cell defined in claim 3, wherein the control circuit is disposed within the cell housing.

9. The cell defined in claim 4, wherein at least a portion of the control circuit is disposed outside the cell housing.

10. The cell defined in claim 1, wherein the cell is a sole source of power to operate the valve.

11. The cell defined in claim 1, wherein the valve is a non-flow inducing valve.

12. The cell defined in claim 1, wherein the actuator is capable of bending and straightening in response to a nonuniform volumetric change within the actuator, induced by a movement of ions when the potential applied across the actuator changes.

13. The cell defined in claim 1, wherein the actuator is capable of elongating and shortening in response to a nonuniform volumetric change within the actuator, induced by a movement of ions when the cell potential applied across the actuator changes.

14. The cell defined in claim 1, wherein the dimensional change is responsive to a faradaic reaction within the actuator.

15. The cell defined in claim 1, wherein the dimensional change is responsive to a capacitive charge on the actuator.

16. The cell defined in claim 1, wherein the valve comprises a passageway and a flap, the flap comprising at least a portion of the actuator.

17. The cell defined in claim 16, wherein the actuator comprises a single sheet with a plurality of flaps.

18. The cell defined in claim 17, wherein the valve comprises a plurality of passageways, each having a corresponding flap.

19. The cell defined in claim 16, wherein the valve comprises a plurality of passageways and a single flap.

20. The cell defined in claim 1, wherein the valve comprises at least one passageway, formed by at least a partial alignment of at least one orifice in each of at least two adjacent plates, and the response of the actuator changes the relative position of the plates, thereby changing the size of the at least one passageway.

21. The cell defined in claim 20, wherein the adjacent plates are discs that are rotated about a mutual axis by the actuator.

22. The cell defined in claim 1, wherein the valve comprises a passageway and a plug.

23. The cell defined in claim 1, wherein the valve comprises at least one area of high permeability surrounded by an area of low permeability to the fluid.

24. The cell defined in claim 1, wherein the valve comprises at least one aperture defined by a surrounding area of low permeability to the fluid.

25. The cell defined in claim 1, wherein the valve can be reversibly moved by the actuator in the open and closed directions.

26. The cell defined in claim 1, wherein the valve and actuator are disposed within the cell housing.

27. The cell defined in claim 1, wherein the valve is disposed between the fluid consuming electrode and the one or more fluid entry ports in the housing.

28. The cell defined in claim 1, wherein the fluid is a gas.

29. The cell defined in claim 28, wherein the gas comprises oxygen and the fluid consuming electrode is a gas reduction electrode.

30. The cell defined in claim 29, wherein the cell is an air depolarized cell.

31. The cell defined in claim 29, wherein the cell is an air assisted cell.

32. The cell defined in claim 1, wherein the cell is fuel cell.

33. The cell defined in claim 1, wherein the cell is a button cell.

34. The cell defined in claim 1, wherein the cell is a cylindrical cell.

35. The cell defined in claim 1, wherein the cell is a prismatic cell.

36. A multiple cell battery comprising at least one cell as defined in claim 1.

* * * * *